[19] United States Patent
Gallina

[11] 4,067,647
[45] Jan. 10, 1978

[54] DUAL FILM STRIP PROJECTOR
[75] Inventor: Harold Gallina, Belleville, N.J.
[73] Assignee: Developing Techniques Laboratory, Inc., Belleville, N.J.
[21] Appl. No.: 604,630
[22] Filed: Aug. 14, 1975
[51] Int. Cl.[2] .................. G03B 31/06; G03B 21/26; G03B 23/02; G11B 31/00
[52] U.S. Cl. .................. 353/19; 352/72; 353/94; 353/DIG. 2; 360/80
[58] Field of Search .................. 353/15–19, 353/94, 82, 34, DIG. 2; 352/72; 360/80

[56] References Cited
U.S. PATENT DOCUMENTS

| | | | |
|---|---|---|---|
| 3,139,789 | 7/1964 | Schrader | 352/128 |
| 3,233,512 | 2/1966 | Sampson | 353/15 |
| 3,561,767 | 2/1971 | Negishi | 360/94 |
| 3,675,994 | 7/1972 | Badalich et al. | 353/19 |
| 3,702,721 | 11/1972 | Skuja | 353/15 |
| 3,748,031 | 8/1973 | Youngblood | 353/15 |
| 3,841,746 | 10/1974 | Chase | 353/15 |

OTHER PUBLICATIONS
Telex, Instructional Cassette Equipment, advertising brochure, Oct. 1973.

Primary Examiner—Steven L. Stephan
Attorney, Agent, or Firm—Brumbaugh, Graves, Donohue & Raymond

[57] ABSTRACT

A dual film strip projector projects images onto at least one screen from a pair of film strips, each of which is advanced in programmed timing independently of the other. The film strips are contained in a cartridge that is readily insertable in the projector, and the timing of the advance of the frames of each film strip is automatically controlled by control signals recorded on a magnetic tape in another cartridge insertable in the projector. The projector includes dual illumination systems, projection lenses and film strip advancing devices. Operation of the projector is entirely automatic in that the control signals on the magnetic tape operate the pair of film strip advancing devices.

15 Claims, 14 Drawing Figures

DUAL FILM STRIP PROJECTOR

BACKGROUND OF THE INVENTION

In multi-media presentation of visual images on a screen or screens, film strip projectors are known which sequentially project visual images from frames of a film strip in response to cuing signals recorded on a magnetic tape. A sound track may also be recorded on the magnetic tape for presentation of sound in conjunction with the visual program. Dual projectors are known which project visual images from slide frames carried by two rotating carousels operated simultaneously such that the image from a slide frame projected by one projector is brought in as the image from a frame projected by the other projector fades out. Further, multiple image programs have also been presented by operating several film strip projectors at the same time independently of each other.

These developments relating to the field of projecting multiple film strip images involve considerable expense and difficulty in setting-up and coordinating the several projectors and operating them simultaneously with sound, to the extent that the projection of multiple image visual programs with sound remains too complex, prohibitively expensive and largely inaccessible to the general public.

SUMMARY OF THE INVENTION

This invention relates to a dual film strip projector for projecting a plurality of images onto at least one screen from the corresponding frames of at least a pair of film strips which are advanced in individually programmed sequences independently of each other. A principal object of the invention is that the apparatus be efficient, inexpensive, simple to use, self-contained, and completely automatic in operation.

In accordance with the invention, a dual film strip projector includes a housing containing light source means, means for directing light from the light source means through at least a pair of film strips and out onto at least one screen, a pair of film strip advancing means for independently advancing a respective one of the film strips, means for driving a magnetic tape, and means for sensing control signals on the magnetic tape and operating the pair of film strip advancing means in response thereto.

The dual film strip projector is programmed for automatic operation upon insertion of a program module, including a film cartridge and a tape cartridge, into the housing. The film cartridge contains the pair of film strips arranged side by side, and the tape cartridge contains the magnetic tape with the control signals and, if desired, a sound program recorded thereon. The film advance drive mechanisms may be either conventional or, preferably, of the solenoid-clutch type shown in U.S. Pat. No. 3,719,129, issued Mar. 6, 1973, to Gallina. Upon positioning the program module in the housing, the projector is completely ready for operation and may then be actuated by pushing a start button, for example. The present invention also concerns the program module, including the film and tape cartridges, used in the dual film strip projector.

In a preferred embodiment, the film cartridge is joined to the tape cartridge to form a single unit insertable in the housing, and the magnetic tape of the program module further includes a sound track for the production of a sound program in synchronism with the program of visual images on the film. The projector further comprises a fail-safe device which must be operated in order to permit the unobstructed insertion or removal of the cartridge unit into or from the housing. The pair of film strips are continuous-loop film strips which are wound on adjacent and parallel reels in an upright position. Each film strip is automatically rewound by exiting from an oblique center spindle of the reel, describing an open loop passing in front of the light source, and being wound as an outer coil at the periphery of the reel.

The light directing system in the preferred embodiment includes a pair of pivotable mirrors which receive the incident light passing through the film strips from a pair of side by side projector lamps and reflect the film images through a pair of focusing lenses in the housing. The pivotable mirrors are arranged at an angle of 45° to the incident light from the projector lamps and face in directions generally opposite each other toward the focusing lenses which are each movably mounted in a side compartment of the housing. The mirrors are meshed together by means of gears and are pivotable to a position aligned with a front-to-back centerline of the projector. When the mirrors are pivoted, the film cartridge may then be inserted into or removed from the housing without obstruction from the mirrors.

The tape drive mechanism in the preferred embodiment comprises a pressure roller which is displaceable into a space in the tape cartridge behind a section of the magnetic tape so that, when the program module is positioned in the housing, the roller engages the magnetic tape against a capstan in the housing external to and adjacent the tape cartridge. The pressure roller is displaceable out of the space in the tape cartridge, in conjunction with the pivoting of the mirrors, to permit both cartridges of the program module to be inserted into or removed from the housing without obstruction. The tape drive mechanism further has a solenoid-driven device for moving the pressure roller from an idle position to a positively engaged position with respect to the magnetic tape, and vice versa.

The preferred embodiment of the present invention also has a device activated by a shut-off signal recorded on another track of the magnetic tape for automatically shutting the projector off at the end of the program. Alternatively or conjunctively with the automatic shut-off device, the projector may further have an automatic synchronizing corrector device, responsive to a reset signal recorded on the magnetic tape at the end of the program, for resetting each of the film strips and the magnetic tape back to the beginning of their respective programs. Such a device may consist, for example, of circuitry which shuts off the projector lamps while rapidly advancing the film strips and magnetic tape back to the beginning, and means for locating the beginning of each of the programs contained thereon and for stopping the respective advancing mechanisms until all programs have been reset. In addition, the projector has: an off-switch and normally-open cut-off switches for manually shutting the projector off; a cooling system for the projector lamps and for the film strips in the vicinity of the lamps; a safety catch functioning as a fail-safe device and for holding the program module securely in position in the housing; and a pair of frame adjustment mechanisms each for independently positioning a respective film strip advancing means such that the frames of the corresponding film strip are properly framed with respect to the projector lamp.

A preferred embodiment and further features and advantages of the invention are described in detail below with reference to the drawings.

DESCRIPTION OF THE PREFERRED EMBODIMENT

Figure 1:
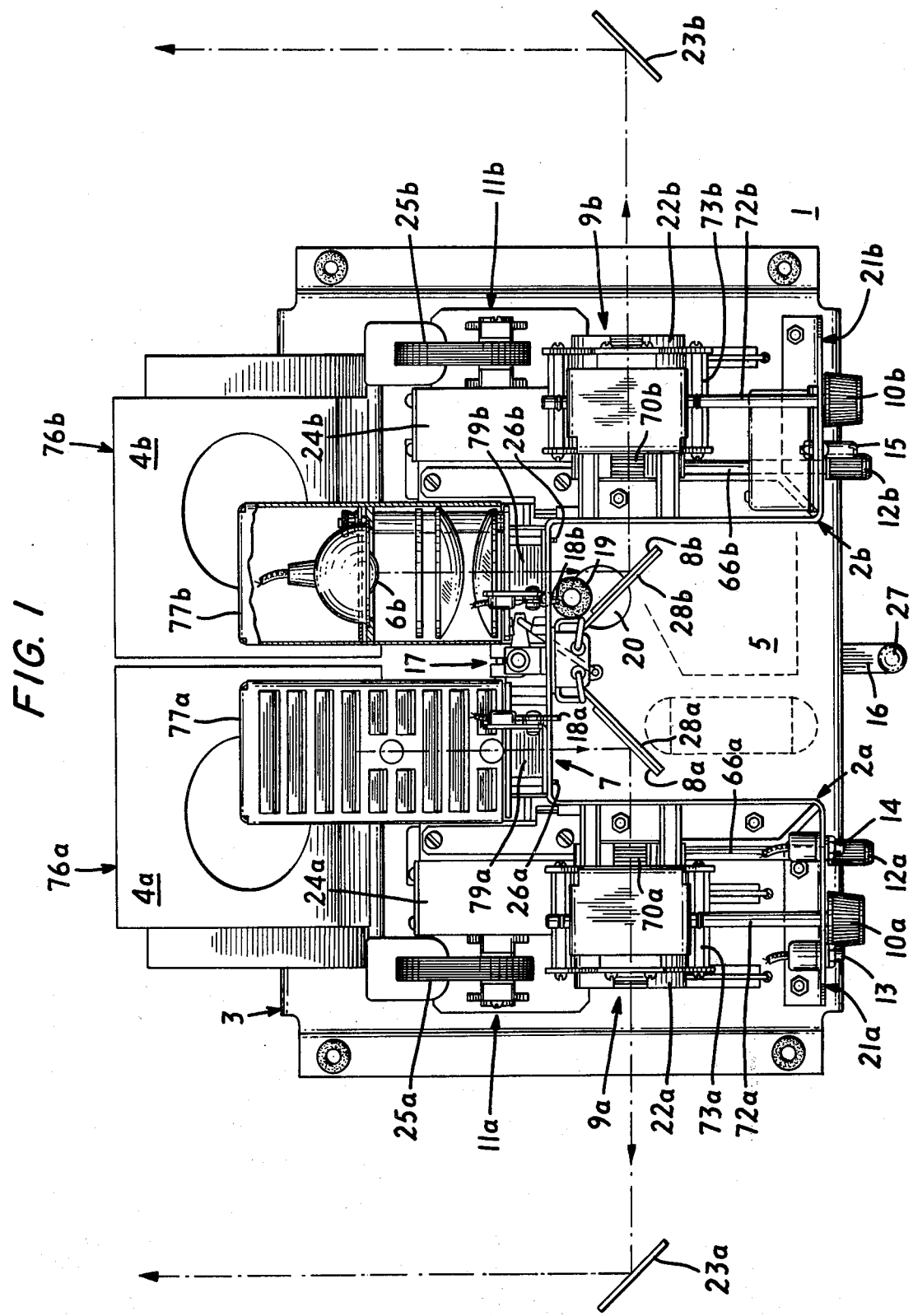
FIG. 1 is a schematic plan view of the embodiment.
Figure 2:
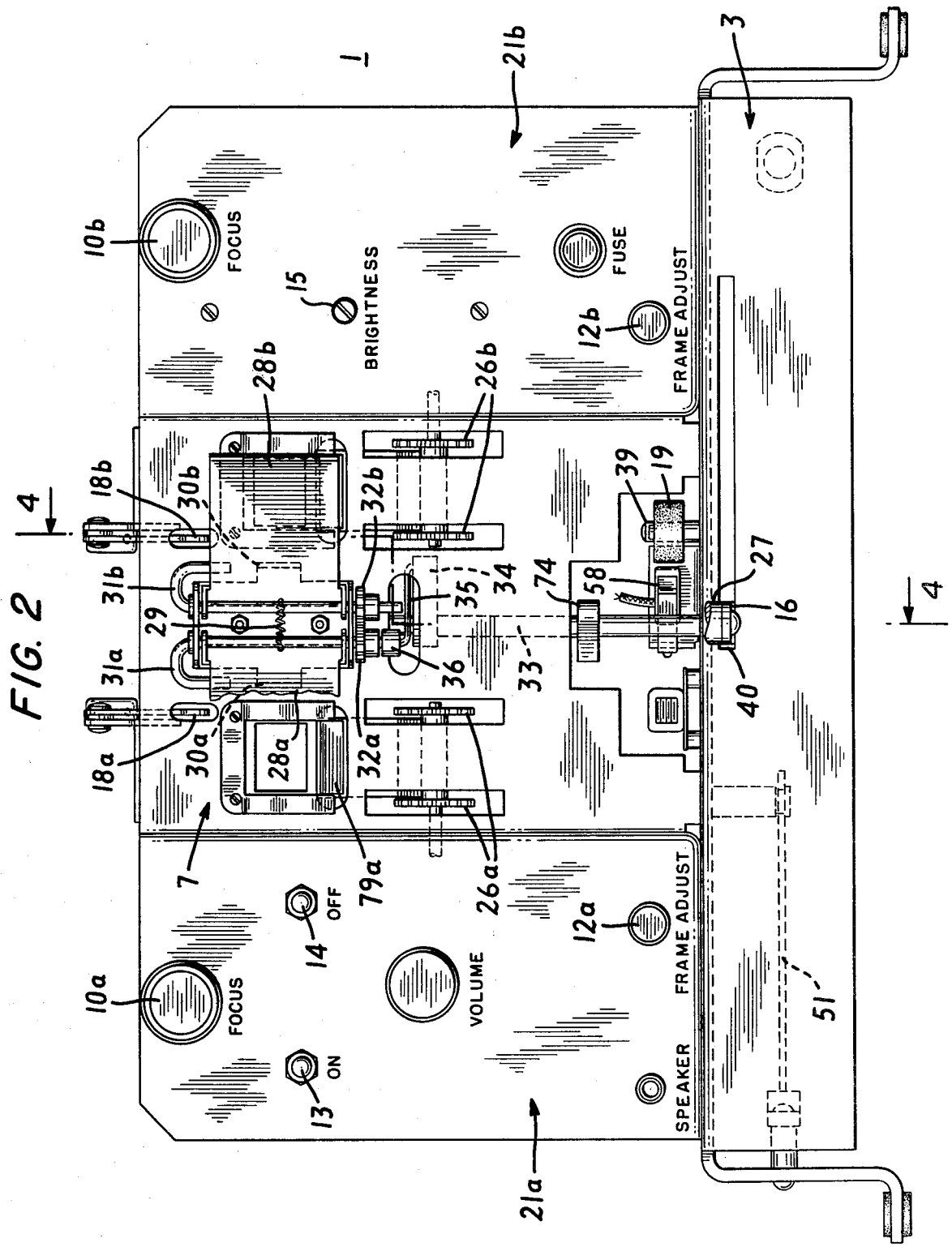
FIG. 2 is a partially schematic front view of the dual film strip projector shown in FIG. 1.

The preferred embodiment of the present invention will now be described with reference to FIGS. 1-14 in which identical elements are designated with the same reference numerals throughout.

GENERAL DESCRIPTION

As illustrated in FIG. 1, a dual film strip projector is oriented with its front bordering the bottom of the drawing and arranged to project light toward the rear, in the direction toward the top of the drawing, onto a screen or screens (not shown). The projector is organized in a housing, generally designated by reference numeral 1, having left and right side compartments 2a and 2b, respectively, a bottom deck 3, left and right projector lamp housings 77a and 77b, respectively, and a module aperture 5, formed with an indentation of the front panel walls 21a, 21b toward a rear panel wall 7, for accommodating in the housing 1 a program module such as that depicted in FIGS. 7-13.

Projector lamps, of which one 6b is shown schematically, are arranged in the lamp housings 77a, 77b forward of and above the main cooling ducts 4a, 4b for casting parallel beams of light through projection lenses and slots in the rear panel wall 7 onto a pair of pivotally mounted mirrors 8a, 8b. For extended use of the projector, an automatic lamp bulb changer may be provided to change lamp bulbs automatically when one burns out. Such a device may consist of, for example, a rotatable turret carrying several lamp bulbs which is triggerable into step-wise rotation by a photoelectric cell or current-measuring switch.

The mirrors 8a, 8b are arranged at an angle of about 45° to the direction of incident light and generally face in opposite directions from each other. Incident light from the projector lamps passes through film strips interposed adjacent the slots in rear panel wall 7 and reflects off the mirrors 8a, 8b in opposite directions substantially normal to the direction of incident light (indicated by broken lines and arrows in FIG. 1). The reflected light then passes through left and right focusing lenses 9a and 9b, respectively, each movably mounted in corresponding lens sleeves 22a, 22b for focal movement along an axis coinciding with the path of reflected light. The focusing lenses 9a, 9b are individually adjusted through manipulation of corresponding focus controls 10a, 10b. The focused light is then directed out from the housing 1 toward a pair of external mirrors 23a, 23b where it is reflected onto at least one screen for the visual display of projected images.

Figure 8:
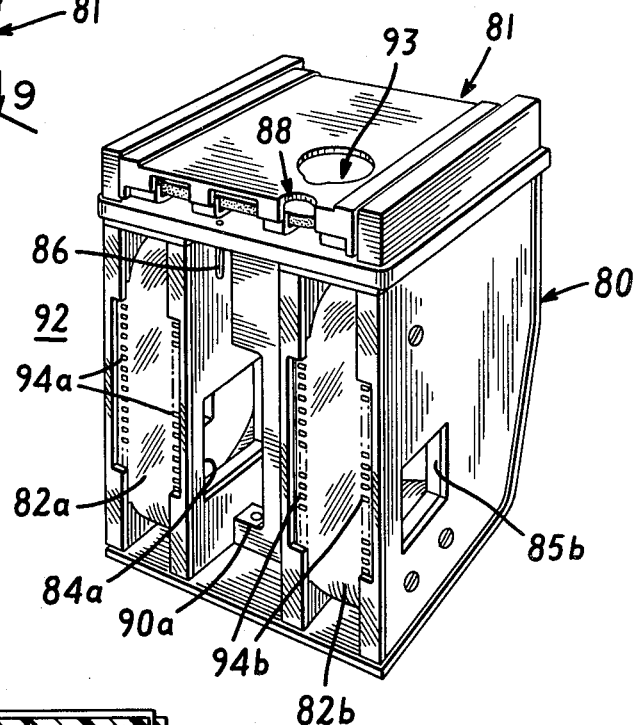
FIG. 8 shows the underside of the program module of FIG. 7.
Figure 9:
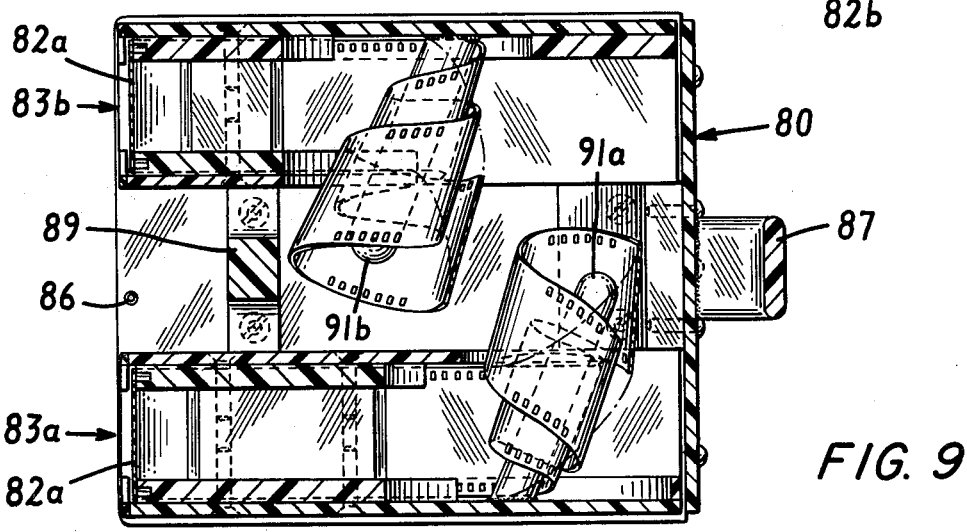
FIG. 9 is a view in horizontal cross-section through the program module.
Figure 10:
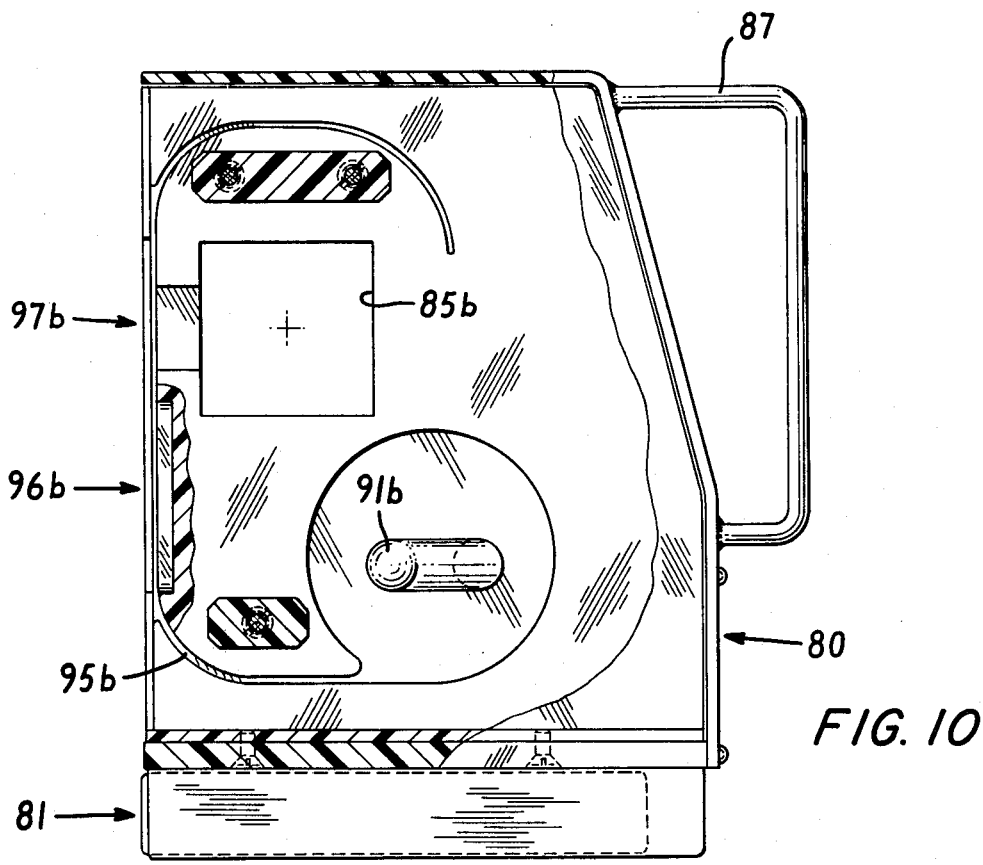
FIG. 10 is a left side vertical cross-sectional view of the program module.
Figure 11:
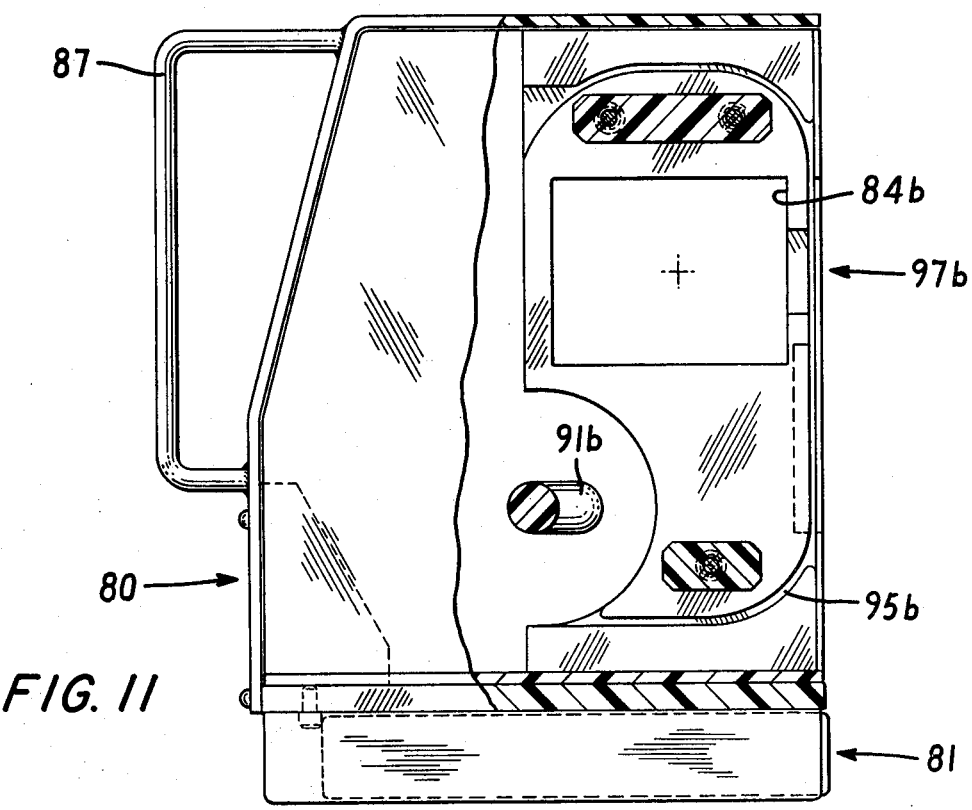
FIG. 11 is a right side vertical cross-sectional view of the program module.
Figure 13:
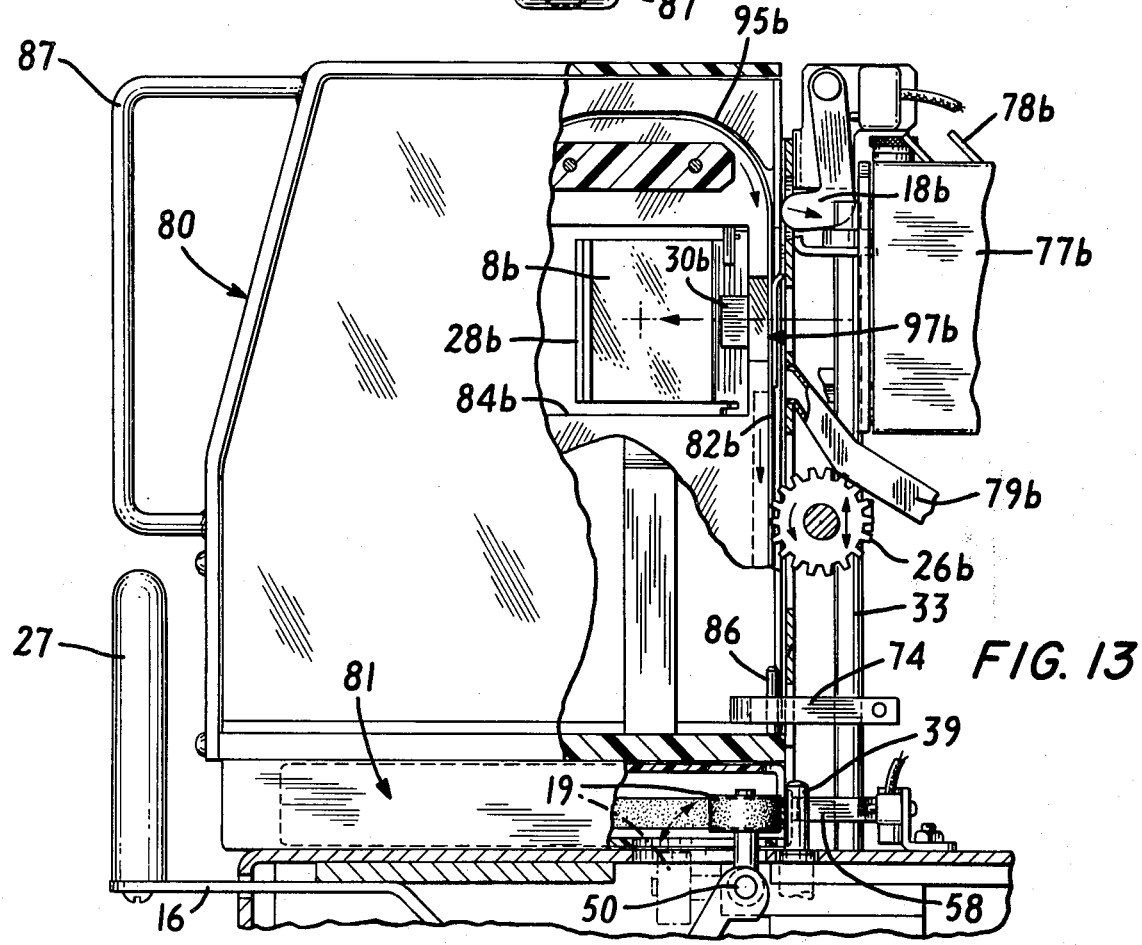
FIG. 13 is a side schematic view of the program module positioned in the projector.
Figure 14:
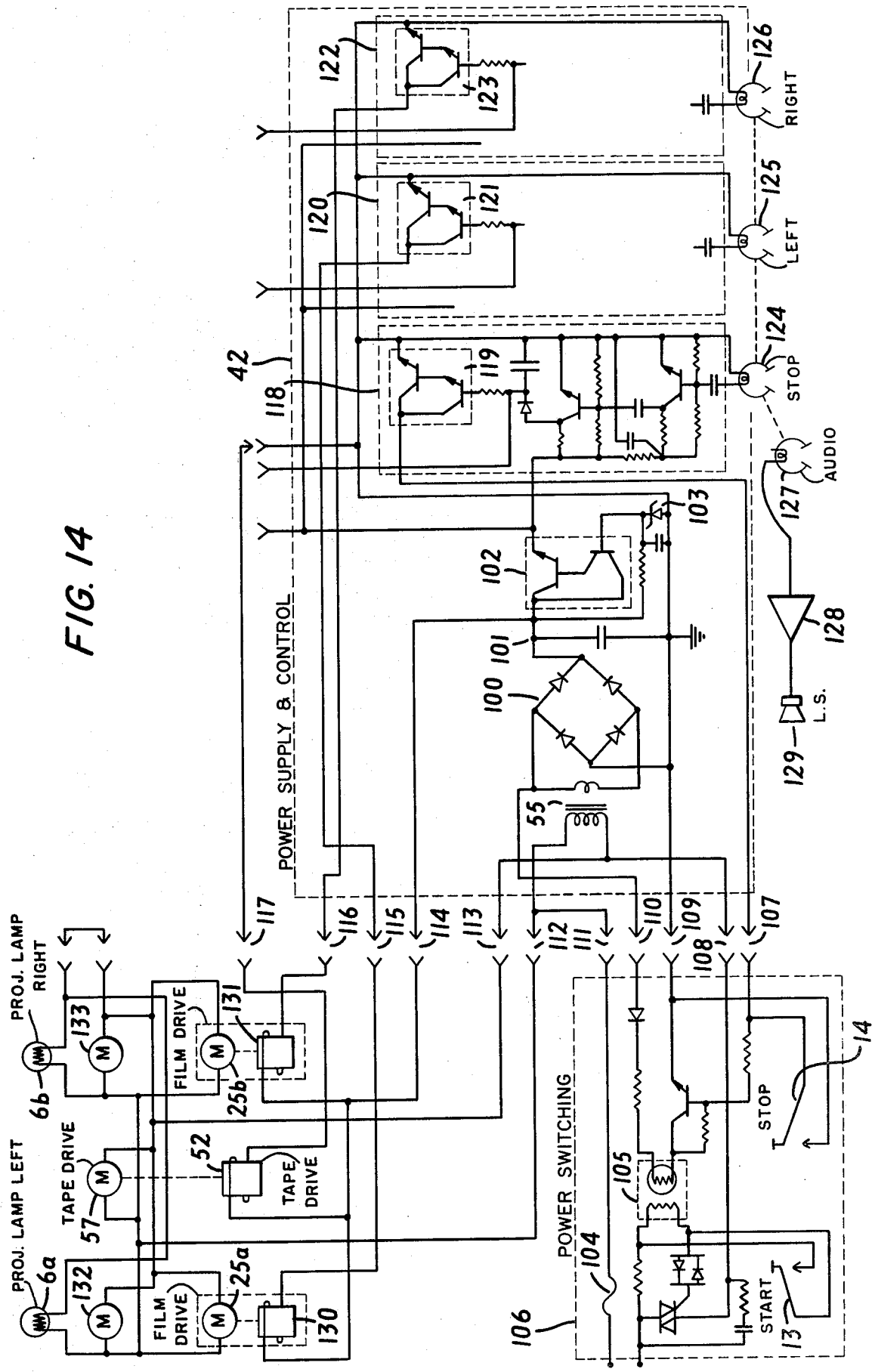
FIG. 14 is a circuit diagram of the principal components of the power supply and control unit of the projector.

Toward the rear of each of the side compartments 2a, 2b are corresponding, independently operated, left and right film advance and elevation assemblies 11a and 11b, respectively. Each assembly includes a vertically displaceable carriage 24a, 24b supporting a left or right film advance drive mechanism consisting of a motor 25a, 25b for driving corresponding sprocket wheels 26a, 26b. Shown more clearly in FIG. 2, the sprocket wheels 26a, 26b have cogs which engage in the perforations 94a, 94b of an associated film strip, as indicated in FIGS. 8 and 13, for advancing the film strip past the projector lamp. By adjusting the elevation of the carriage 24a, 24b, the sprocket wheels may be vertically positioned to locate the frames of the associated film strip in relation to the corresponding projector lamp, as shown in FIG. 13, such that the images projected by the projector include the visual images of entire frames. Adjustment of the elevation of the carriage 24a, 24b, is accomplished individually on each side by way of left and right frame adjust controls 12a and 12b, respectively.

Figure 12:
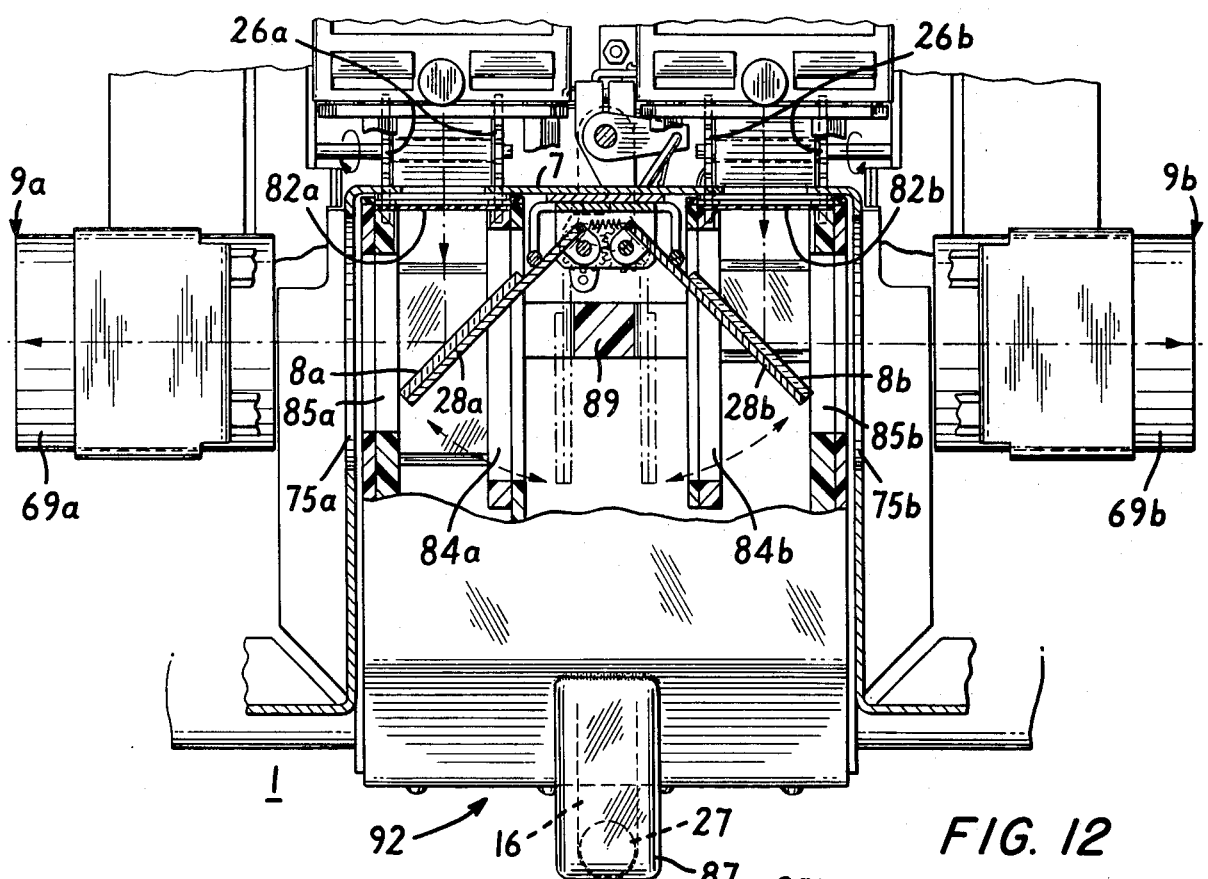
FIG. 12 shows a generally schematic plan view of the program module positioned in the projector.

Extending from the bottom deck 3 at the front of the projector is a lever arm 16 (shown in its normal rest position in FIG. 1). The lever arm 16 operates a pivot assembly 17 for pivoting the mirrors 8a, 8b into a position permitting insertion or removal of the program module into or from the aperture 5 without obstruction from the mirrors, as depicted in FIG. 12. The operation of the pivot assembly 17 is explained below in detail. Protruding through the rear panel wall 7 into the module aperture 5 above and to either side of the pivot assembly 17 are left and right cut-off switches 18a and 18b, respectively. The switches are used conjunctively with the automatic synchronizing corrector device mentioned earlier for suspending operation of the projector when the corrector device has completed its function of resetting the film strips and magnetic tape back to the beginning of each of their respective programs. Additionally, the switches 18a and 18b may be used to cut off power to the power mechanisms in the projector when the program module is removed or if a film strip should break. The main power switches for the projector are located on the left front panel wall 21a and include an on-switch 13 and an off-switch 14.

Figure 4:
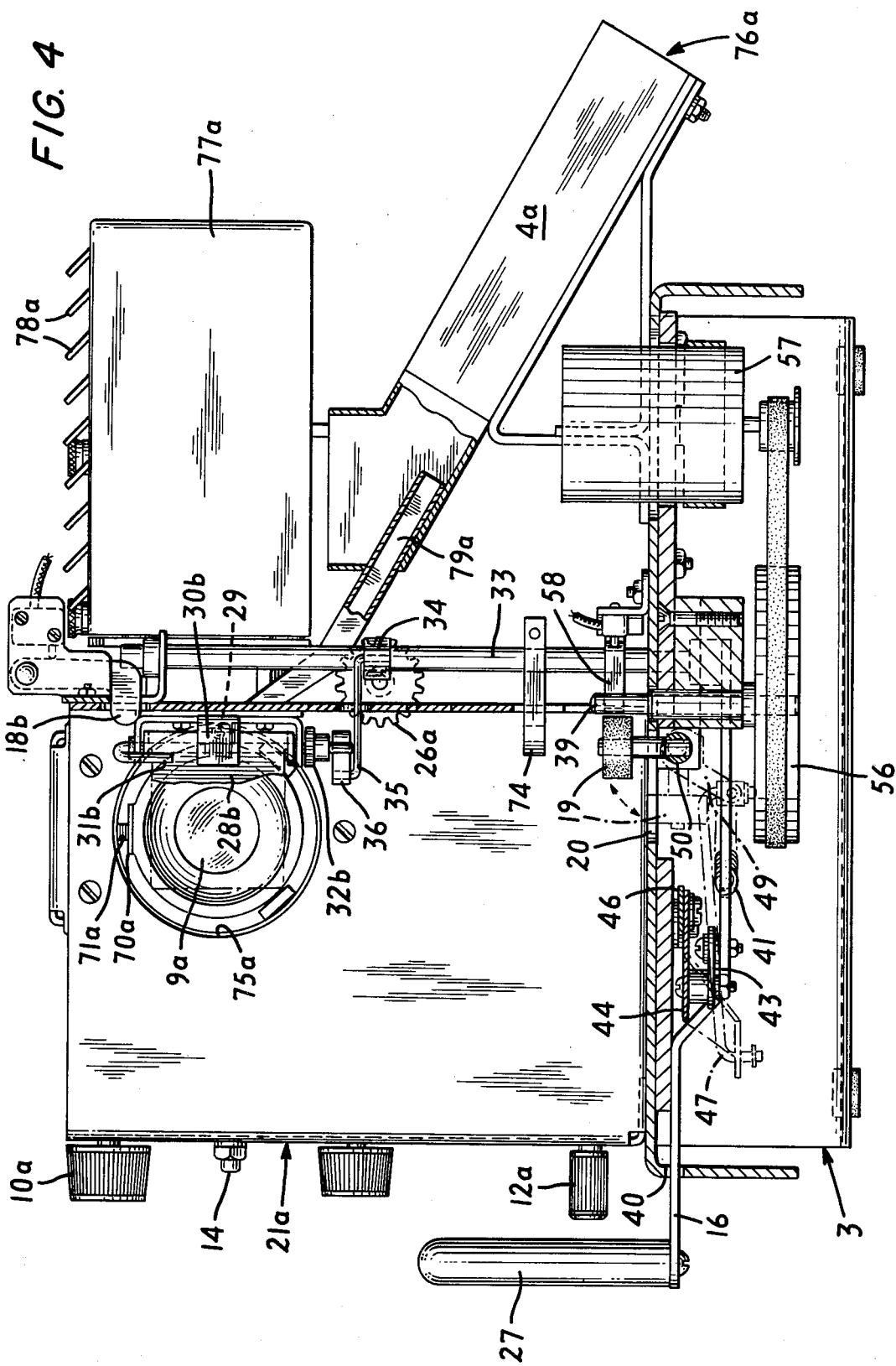
FIG. 4 shows a left side, partly schematic view of details of the pivot assembly, tape drive assembly, and cooling system.

With reference to FIGS. 1, 4 and 13, a rotatably mounted pressure roller 19 is located below and to the right of the pivot assembly 17 for engaging a section of magnetic tape in a tape cartridge 81 of the program module 92 against a capstan 39 of the tape drive mechanism. The pressure roller 19 may be displaced into a hole 20 in the platform surface of the bottom deck 3 in order to permit the program module to be inserted or removed from the aperture 5 without obstruction from the pressure roller. The pressure roller displacement mechanism is operated in conjunction with the mirror pivot assembly 17 by means of the lever arm 16, in a manner to be described further.

PIVOT ASSEMBLY

Figure 6:
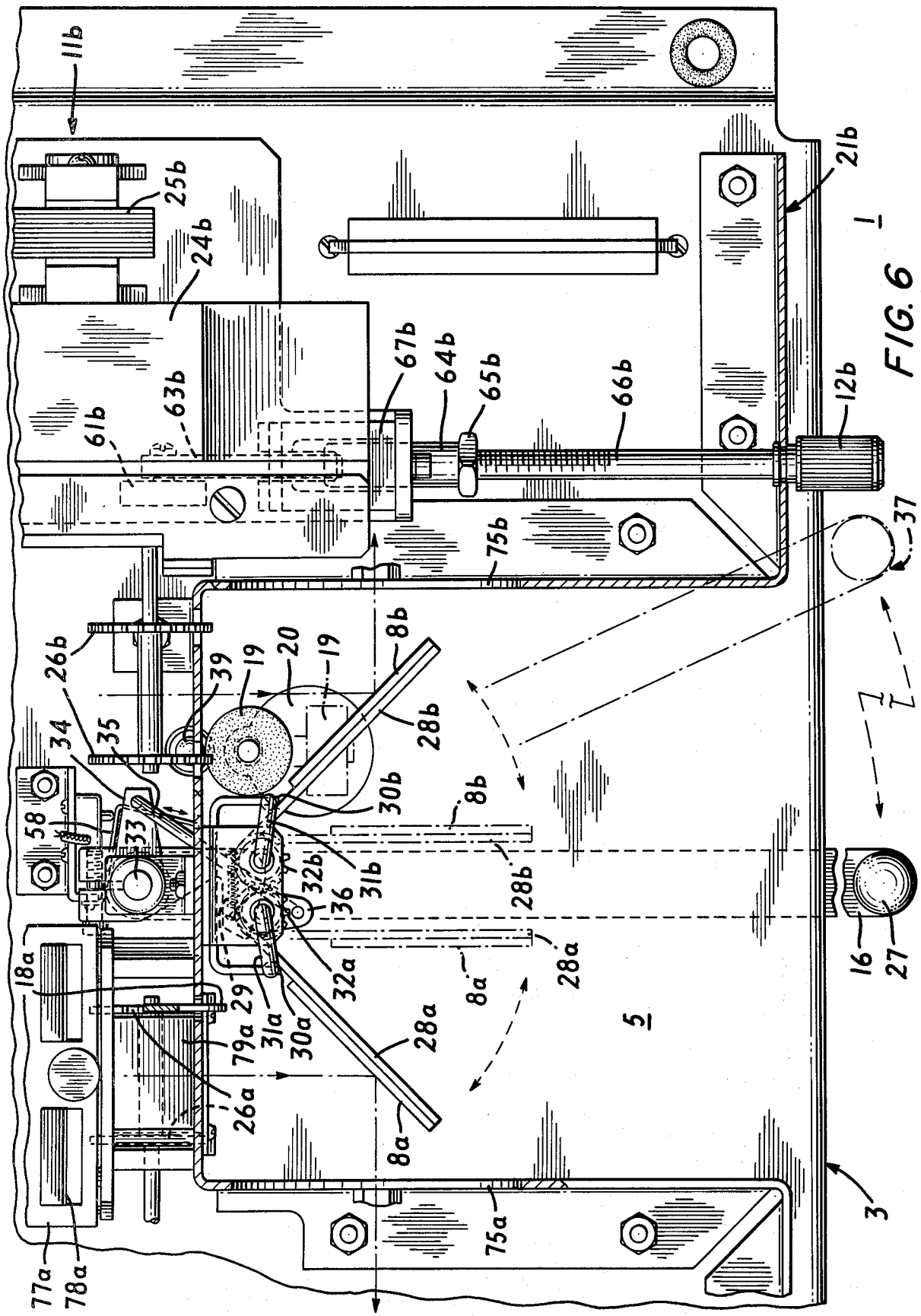
FIG. 6 is an enlarged schematic plan view of the pivot assembly and the film drive and elevation assembly.
Figure 7:
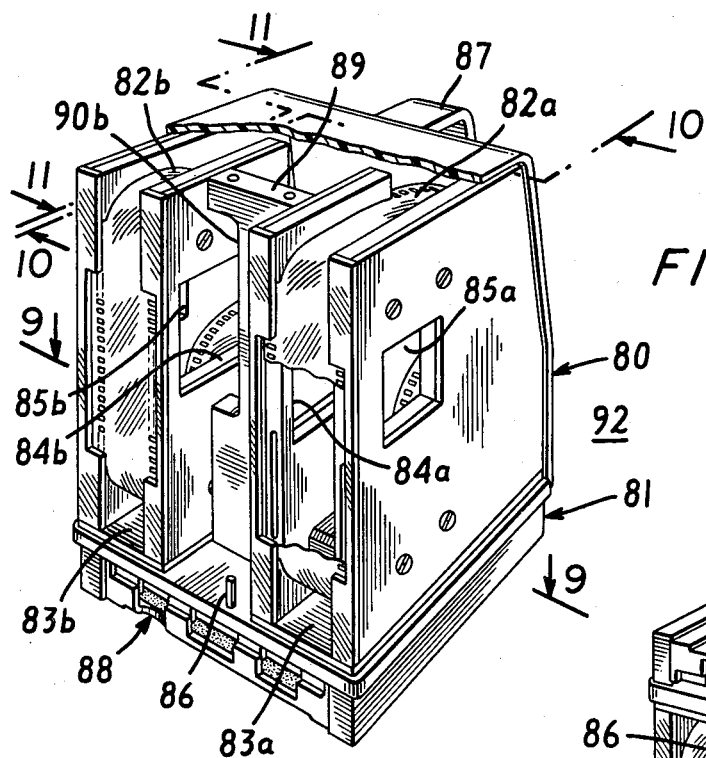
FIG. 7 is a cut-away perspective view of the program module.

The normal operative position of the mirrors 8a, 8b is shown in solid lines in FIGS. 6 and 12. In this position, the mirrors 8a, 8b are located in the interior of the respective reel housings 83a, 83b in back of the corresponding film strips 82a, 82b wound on the reels. Light cast by the projector lamps passes through the film strips and reflects off the mirrors out through the respective external cut-outs 85a, 85b in each reel housing 83a, 83b. The pivot assembly 17 is designed to pivot the mirrors 8a, 8b into a position which would permit the program module to be inserted or removed from the module aperture 5 of the housing 1 without obstruction.

As shown in phantom lines in FIGS. 6 and 12, the mirrors 8a, 8b are pivoted through an angle of about 45° to a position substantially parallel with the front-to-back center-line of the projector by displacement of the lever arm to the right of the housing 1. In the pivoted position, the mirrors 8a, 8b are parallel to and adjacent each other and dovetail between the indentations 90a, 90b of a T-bar 89 in the film cartridge 80, on one hand, and the left and right reel housings 83a and 83b, respectively, on the other hand (see FIGS. 7–8 and 12). The mirrors 8a, 8b are fixed to corresponding swing arms 28a, 28b which are rotatably mounted to the pivot assembly 17. A swing arm spring 29 biases the swing arms 28a, 29b apart to rest against corresponding swing arm back stops 30a, 30b. Flange arms 31a, 31b are coupled together for simultaneous rotation by means of corresponding meshed gears 32a, 32b and have downturned ends, each of which is hooked over the top edge of a respective swing arm 28a, 28b.

Displacement of the lever arm 16 results in axial rotation of a main shaft 33 to which is fixed a first cam plate 34. A connecting rod 35 couples the first cam plate 34 to a second cam plate 36, which is rigidly connected to the left flange arm 31a. Displacement of the first cam plate in the counter-clockwise direction, due to axial rotation of the main shaft 33, results in counter-clockwise rotation of the second cam plate 36 and, therefore, also the left gear 32a and the left flange arm 31a. Due to the meshing of the gears 32a and 32b, a complementary clockwise rotation is thereupon imparted to the right gear 32b and right flange arm 31b. With the mirrors 8a, 8b thus pivoted by the flange arms 31a, 31b, and the lever arm 16 in the displaced position 37, the program module may now be inserted or removed without obstruction, as in FIG. 12.

The pivot assembly 17 is operated conjunctively with two fail-safe devices arranged to prevent the removal or insertion of the program module 92 from or into the module aperture 5 without first pivoting the mirrors 8a, 8b and displacing the pressure roller 19. With reference to FIG. 13, a first fail-safe device consists of a lever arm grip 27 connected to the lever arm 16 and is located so that it blocks the entrance to the module aperture 5. Insertion or removal of the program module can take place only upon first displacing the lever arm grip 27, and therefore the lever arm 16, to a displaced position 37, which results in pivoting of the mirrors 8a, 8b and displacing the pressure roller 19.

A second fail-safe device consists of a safety catch member 74 fixed to the main shaft 33 above the capstan 39. When the program module 92 is positioned in the module aperture 5, and the lever arm returned to its normal rest position, the safety catch member 74 engages a safety pin 86 located between the reel housings 83a, 83b of the film cartridge of the program module 92. With the pin 86 thus engaged, the program module 92 cannot be removed without first rotating the safety catch 74 clear of the pin 86 through rotation of the main shaft 33 by means of lever arm 16. The safety catch member 74 also secures the program module 92 in position in the housing 1 during operation of the projector.

TAPE DRIVE ASSEMBLY

In order to insert the program module 92 into the housing 1, the lever arm 16 is displaced in the manner previously explained such that the pressure roller 19 is rotated into the hole 20 in the platform surface of the bottom deck 3. When the program module 92 is positioned in the aperture 5 of the housing 1, as shown in FIG. 13, an exposed section 88 of magnetic tape is disposed adjacent the capstan 39 of the tape drive mechanism. The lever arm 16 is then returned to its normal rest position, whereby the pressure roller 19 is rotated back upward through the hole 20 into a space 93 defined in a bottom wall of the tape cartridge (see FIG. 8) behind the exposed section 88 of the magnetic tape so as to engage the magnetic tape against the capstan 39.

Figure 5:
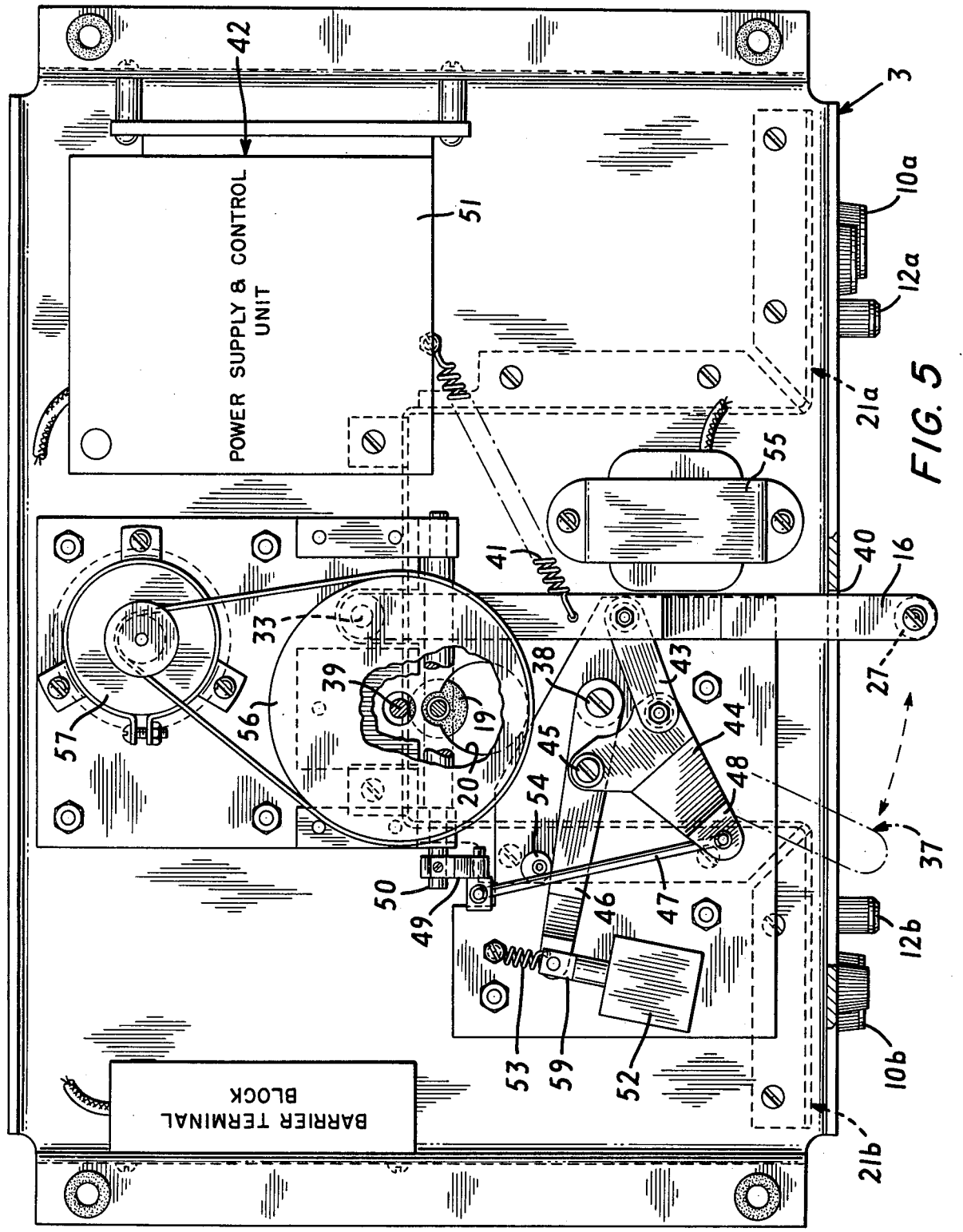
FIG. 5 is a view of the underside of the projector showing details of the tape drive assembly.

The pressure roller displacement mechanism is illustrated in FIG. 5 of the drawings. The lever arm 16 is rotatable about a pivot at the main shaft 33. Normally, the lever arm 16 is biased to its normal rest position against a lever arm stop member 40 by a lever arm spring 41 extensibly connected between a point roughly midway of the lever arm 16 and a shelf 51 for the power supply and control unit 42. A joint piece 43 couples the lever arm 16 to a shift plate 44 pivotally anchored by means of a shift plate anchor pin 45 to a movable pressure bar 46. One end of the pressure bar 46 is pivotally mounted to the platform surface of the bottom deck 3 by a pressure bar anchor pin 38, while the other end of the pressure bar 46 is coupled to an armature end 59 of a pressure bar solenoid 52 mounted to the platform surface of the bottom deck 3. The armature end 59 is also connected to a pressure bar spring 53 which biases the pressure bar 46 generally away from the solenoid 52 toward a backstop 54. A push rod 47 is coupled between an oblong work end 48 of the shift plate 44 and a crank 49 which is fixed to a rotatable crank pin 50 mounting the pressure roller 19.

Upon displacement of the lever arm 16 to the left of FIG. 5, the joint piece 43 pivots the shift plate 44 about its anchor pin 45. Pivoting the shift plate 44 causes the oblong work end 48 to drive the push rod 47 which then cranks the crank pin 50 into right-handed rotational movement. That is to say, the crank pin 50 is rotated such that the pressure roller 19 is displaced into the hole 20. When the lever arm 16 is returned to its normal rest position, the pressure roller 19 is rotated back toward the capstan 39.

With the solenoid unactivated and the pressure bar spring-biased against the backstop 54, the shift plate 44 is anchored in a position such that the push rod 47 has the crank 49 still somewhat displaced. This slight displacement is sufficient to remove the pressure roller 19 from positive engagement with the capstan 39. Activation of the solenoid 52 moves the pressure bar 46 away from the back stop 54, thus shifting the anchor pin 45 of the shift plate 44 in a direction toward the front of the housing 1. This shifting movement results in a full return of the crank 49 to a position wherein the pressure roller 19 is positively engaged with the capstan 39. Thus, the solenoid 52 functions to move the pressure roller 19 between an idle position and a positively engaged position. In this manner, the magnetic tape may be started and stopped. The circuitry for operating this engagement mechanism in the tape drive assembly is discussed in greater detail, infra.

As shown in FIG. 4, the capstan 39 is journaled in the platform surface of the bottom deck 3 and fixed to the center of a fly wheel 56. The fly wheel is connected by an endless belt to the drive shaft of a tape drive motor 57. A magnetic pick up device 58 is arranged in the vicinity of the capstan 39 for picking up the signals recorded on the magnetic tape as it is pulled between the pressure roller 19 and the driven capstan 39.

FILM ADVANCE AND ELEVATION ASSEMBLY

Figure 3:
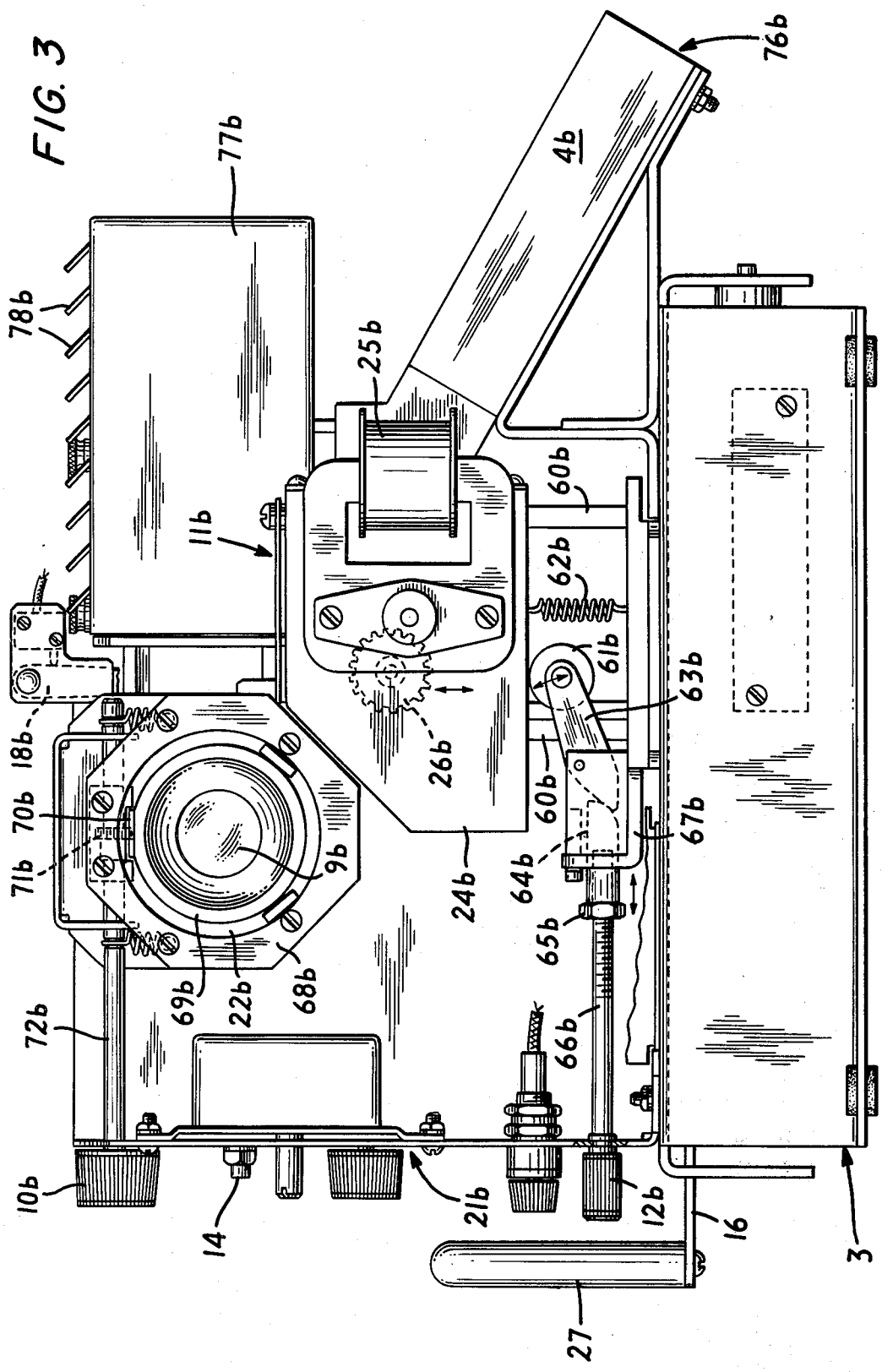
FIG. 3 shows a right side, partly schematic view of details of the focus assembly and the film drive and elevation assembly in the projector.

As described previously, the left and right film advance drive mechanisms 25a and 25b, including respective film strip engaging sprocket wheels 26a and 26b, are mounted in vertically adjustable carriages 24a, 24b for proper framing of the film strips with respect to the projector optics. Both mechanisms are identical, except for complementary handedness, and the following description of the left one applies to both. As shown in FIG. 3, the carriage 24b of the film advance and elevation assembly 11b is movably mounted on guide studs 60b. The carriage 24b is supported by a thrust wheel 61b acting from beneath against both the weight of the carriage 24b and a biasing carriage spring 62b. The thrust wheel is rotatably pinned to one end of a push lever 63b which is pivotably mounted at a point between its ends to a sleeve member 67b in the left side compartment 2b of the housing 1. The other end of the push lever 63b is engaged by a driver 64b, and the lever action of the push lever 63b functions to translate the horizontal adjusting movements of the driver 64b into vertical positioning of the carriage 24b. The driver 64b has an internally threaded nut 65b at its shank end which is meshed with the threaded end of an adjusting rod 66b. The adjusting rod 66b is journaled in the front panel wall 21b of the housing 1 and extends outside the housing so as to furnish the frame adjust control 12b. A complementary elevation assembly is provided in the right side compartment 2a of the housing 1 for framing adjustment of the right film advance drive mechanism 25a.

The mechanism for driving the sprocket wheel 26a or 26b of the respective film advance mechanisms is that described and shown in Gallina U.S. Pat. No. 3,719,129 issued Mar. 6, 1973, for "Drive Mechanism" and therefore is not shown in the drawings hereof or described herein; reference may be made to the patent for a complete understanding of such mechanism, it being clear that such a mechanism is coupled to each sprocket wheel 26a or 26b and is suitably mounted on the respective carriage 24a or 24b.

FOCUS ASSEMBLY

The focus assemblies on both sides of the projector are also identical except as to hand. With reference to FIGS. 1 and 3, which show the left assembly, the lens 9b is fixedly centered in a slide tube 69b. The slide tube 69b is slidably mounted in a lens sleeve 22b and has a rack 70b running lengthwise along the top of the tube 69b. The sleeve 22b has a longitudinal cleft corresponding to the rack 70b such that when the lens-carrying slide tube 69b is telescoped into the lens sleeve 22b, the rack 70b is exposed through the longitudinal cleft. The sleeve 22b is held at both ends in face plates 68b which are spaced apart and bolted together through spacer studs 73b. The entire assembly is mounted in the left side compartment 2b transversely of the housing 1 and positioned so as to receive projected light reflecting from the left, pivotable mirror 8b.

A left focus adjusting rod 72b is journaled in the left front panel wall 21b and extends inwardly over and transversely of the lens sleeve 22b. A cog wheel 71b is fixed on the adjusting rod 72b and engages the rack 70b on the slide tube 69b exposed by the cleft in the sleeve 22b. Biasing springs hold the adjusting rod 72b in mesh with the rack 70b. One end of the adjusting rod 72b extends through the front panel wall 21b provides the left focus control 10b. By turning the focus control 10b, the slide tube 69b can be adjusted in the transverse direction along the path of reflected light from the mirror 8b, thereby adjusting the focus of projected light ultimately displayed on the screen or screens. A complementary assembly is utilized for the right focusing lens 9a.

COOLING SYSTEM

In FIGS. 1 and 4, main cooling ducts 4a, 4b admit cool air through duct openings 76a, 76b and draft the air up by means of fans (not shown) into the lamp housings 77a, 77b. The cool air passes over the lamps and exhausts through angled slats 78a, 78b on top of the lamp housings 77a, 77b. Auxiliary cooling ducts, such as the one 79a shown schematically in FIG. 4, branch off from the main cooling ducts 4a, 4b to draft cool air into the vicinity of the slots in the rear panel wall 7 to cool the film strips passing in front of the projector lamps.

PROGRAM MODULE

As illustrated in FIGS. 7-13, the program module 92 includes a film cartridge 80 and a tape cartridge 81 joined below and disposed transversely of the film cartridge, the two cartridges making up an integral unit insertable into the module aperture 5 of the housing 1. The two film strips 82a, 82b are arranged in reel housings 83a, 83b which are disposed upright, parallel, and adjacent each other in the cartridge 80. The reel housings 83a, 83b are spaced apart by a T-bar 89 which has indented sides 90a, 90b. These indentations permit the pivoted mirrors (phantom lines in FIG. 12) to be dovetailed into the space between the reel housings 83a, 83b when the program module is inserted in the module aperture 5. The reel housings have internal cut-outs 84a, 84b into which the pivotable mirrors 8a, 8b are opened such that the film strips 82a, 82b are interposed between the mirrors 8a, 8b and the projector lamps. External cut-outs 85a, 85b in the reel housings 83a, 83b permit the light image passing from the film and reflecting off the mirrors to emerge from the film cartridge 80. The external cut-outs 85a, 85b overlie corresponding cut-outs 75a, 75b in the walls of the side compartments 2a, 2b of the housing, whereby light emerging from the film cartridge 80 is allowed to pass on through to the focusing lenses 9a, 9b. A safety pin 86 is fixed between the reel housings 83a, 83b of the film cartridge and is engageable by a pivotable safety catch 74 mounted on the main shaft 33, for securing the program module 92 in position in the housing 1 and as a fail-safe device. A handle 87 is provided on the program module 92 for facilitating insertion or removal thereof. The film strips 82a, 82b each have sprocket holes 94a, 94b running along both sides for engagement with the corresponding sprocket wheels 26a, 26b of the film advance drive mechanisms.

The real housings 83a, 83b have oblique center spindles 91a, 91b along which the internal coils of each of the continuous-loop film strips 82a, 82b spiral out into the space between the reels. Each spiraled portion is guided by means of tracking grooves 25a, 95b (FIG. 10) upwardly in the reel housing and describes an open loop into which the corresponding mirror is operatively positioned. Each film strip is then guided down over the front of the program module 92 where it is illuminated by the corresponding projector lamp. After passing before a respective one of the openings 97a, 97b in the reel housings through which light is directed from the projector lamps onto the mirrors, each film strip is then guided by means of engagement with the sprocket wheels 26a, 26b (area indicated by reference numeral 96b in FIG. 10) back onto an outer periphery of the reel, where it is gradually wound through diminishing turns back into the internal coils of the reel.

The tape cartridge 81 contains a continuous-loop magnetic tape including an exposed section 88 which is disposed adjacent the capstan 39 of the tape drive mechanism when the program module 92 is positioned in the module aperture 5. A space 93 is defined in a bottom wall of the tape cartridge (FIG. 8) behind the exposed section of tape 88. The space 93 corresponds to the hole 20 in the platform surface of the bottom deck 3, whereby the pressure roller 19 is displaceable from a position below the platform surface into the defined space 93, and vice versa, for engagement of the magnetic tape against the capstan 39 and for displacement from the module aperture 5 during insertion or removal of the program module 92.

POWER SUPPLY AND CONTROL UNIT

The power supply and control unit 42 for the dual film strip projector is mounted on a shelf 51 in the bottom deck 3 of the housing 1 and includes a transformer 55 also located in the bottom deck 3. Referring to the circuit diagram in FIG. 14, a power switching device 106, interposed between the output terminals of an alternating current source (conventionally 120 VAC, 60 Hz.) and the unit 42, has a fuse 104 and a photocell trigger 105. The photocell trigger is primed by a start key, i.e., the on-switch 13, and is triggered to cut off power to the unit 42 in response to a ground potential applied either manually by a stop key, i.e., the off-switch 14, or automatically by the output of the automatic shut-off means 118. The power switching device includes the following terminals: 120 VAC lines 108 and 111, 12 VAC line 110, ground line 109, and automatic shut-off line 107. The photocell trigger 105 is biased in operation by the 12 VAC line 110 and the ground line 109.

The 120 VAC lines 108 and 111 supply alternating current through lines 113 and 112 to the left and right fan motors 132 and 133, respectively, of the cooling system, to the left and right projector lamps 6a and 6b, respectively, to the tape drive motor 57, and to the left and right film advance motors 25a and 25b, respectively, of the film advance assemblies 11a, 11b. The 120 VAC lines 108 and 111 are also connected through the transformer 55, a rectifier stage 100, a filter stage 101, and a Zener diode 103 to produce 12 VDC power. The 12 VAC line 110 is tapped from the low voltage side of the transformer 55 before the rectifier stage 100.

From the power supply, 12 VDC power is provided through line 114 to one terminal of the solenoid 52 of the engage mechanism in the tape drive assembly, and to one terminal of each of the left and right solenoids 130 and 131, respectively, corresponding to the left and right film advance motors 25a, 25b for engaging the motors to drive the sprocket wheels 26a, 26b of the film advance assemblies 11a, 11b. The other terminal of the solenoid 52 is connected to ground through line 117; hence, the solenoid 52 operates to positively engage the pressure roller against the capstan as long as the power through the power switching device 106 is turned on. Lines 115 and 116 are each respectively connected to the other terminal ends of the corresponding film drive solenoids 130, 131, the solenoids being for the most part inactive due to a 12 VDC potential supplied through lines 115 and 116 matching the potential supplied by line 114. In response to control signals sensed on the magnetic tape, a ground potential may be supplied from either of the left or right film drive control means 120, 122 through lines 115 or 116 when the respective film drive mechanism is to be activated.

The control unit consists of automatic shut-off means 118 and left and right film drive control means 120 and 122. Each of these means is responsive to signals sensed from the magnetic tape through a magnetic pick up device 58, which includes an automatic shut-off signal sensing head 124 and 126, respectively. The pick up device 58 also has an audio signal sensing head 127 which picks up audio signals from the magnetic tape to be amplified by an audio amplifier 128 driving a loudspeaker 129. The above means are supplied 12 VDC power from the power supply through a Darlington voltage regulator stage 102, and each includes an amplifier stage, shown only for the automatic shut-off means 118, and a Darlington impedance matching stage 119, 121, 123 interposed between the amplifier stage and an output line 107, 115, 116.

For automatic resetting of the film strips and magnetic tape to the beginning of each of their respective programs, an automatic synchronizing corrector device may be added to the above circuitry, as discussed previously.

BRIEF SUMMARY OF OPERATION

The various parts and assemblies described above cooperate in the operation of the dual film strip projector as follows. After plugging the projector into a conventional alternating current source, the projector is programmed for automatic operation by inserting the program module 92 into the module aperture 5 of the housing 1. Insertion is accomplished by displacing the lever arm grip 27 of the lever arm 16 from its blocking position in front of the module aperture to the displaced position 37, shown in FIGS. 5 and 6. Displacement of the lever arm rotates the main shaft 33 which results in pivotal movement through the pivot assembly 17 of the mirrors 8a, 8b to the position shown in phantom lines in FIGS. 6 and 12, and in displacement of the safety catch 74 from its pin-engaging position and of the pressure roller 19 into the hole 20 in the platform surface of the bottom deck 3.

With the module aperture thus cleared of obstructions, the program module is then inserted into the projector. Upon positioning the module in the aperture, the lever arm and lever arm grip are returned back to the normal rest position, resulting in: repositioning the lever arm grip to the blocking position; pivoting the mirrors, dovetailed between the reel sections 83a, 83b in the film cartridge 80 of the program module, into the respective reel sections behind the corresponding film strips 82a, 82b; engaging the safety catch with the safety pin 86 in the film cartridge; and displacing the pressure roller out of the hole in the bottom deck into the space 93 defined in the bottom wall of the tape cartridge 81 in back of the exposed section of magnetic tape at the front face of the tape cartridge. Insertion of the module into the projector also brings the film strips at the front of the module into contact with the cut-off switches 18a, 18b at the rear panel wall 7 of the housing, for operation in conjunction with the corrector device, as previously described.

The projector is now ready for operation and may be started by depressing the on-switch 13 which primes the photocell power switching device 105. Alternating current is thus supplied to the tape drive motor 57, projector lamps 6a, 6b, fans 132, 133 in the cooling system, and to the film drive motors 25a, 25b. Through power conversion stages 55, 100, 101, 102, 103, low voltage direct current is supplied to the solenoid 52 of the engage mechanism in the tape drive assembly, and the the clutch solenoids 130, 131 of the film drive assemblies 11a, 11b. Direct current is also provided through the Darlington voltage regulator state 102 to the automatic shut-off device 124 and the film drive control devices 125, 126.

With the engage mechanism solenoid activated, the pressure roller is moved to positively engage the magnetic tape from within the tape cartridge against the external capstan 39 driven by the tape drive motor. The magnetic pick-up device 58 senses control signals on the magnetic tape and activates the left or right film drive control devices to operate the film drive advance mechanisms in response thereto. The control signals are conveniently recorded on the magnetic tape to individually program the timed sequences of film image display for each film strip independently of the other to produce a varied visual program of multiple independent images. (The film strips may also be driven fast enough to produce a combination of motion picture and still programs as well.) The magnetic pick-up device additionally senses recorded audio signals on the magnetic tape and relays them to the audio amplifier 128 and loudspeaker 129 for the production of sound in synchronism with the visual program. Adjustments for focusing, brightness, framing of the film images, and for sound volume may be made through manipulation of the controls at the front panel walls 21a, 21b of the housing.

When the taped program is ended, the pick-up device senses the shut-off signal recorded on the magnetic tape and activates the automatic shut-off device operating the photocell trigger 105 of the power switching device, to automatically shut the power off in the projector and disengage the pressure roller from the magnetic tape. The projector may also be shut off manually by depressing the off-switch 14 or by opening the cut-off switches by removing the module from the projector. The module is removed from the projector upon first displacing the lever arm grip and lever arm in the manner previously described.

It will be understood that the above described embodiment is merely exemplary and that those skilled in the art may make many variations and modifications without departing from the spirit and scope of the invention. All such modifications and variations are intended to be within the scope of the invention as defined in the appended claims.

I claim:

1. A self-contained, automatic, dual film strip projector for projecting a plurality of images onto at least one screen, each of said images being projected from a corresponding frame of one of a pair of film strips which are operated in individually timed sequences independently of each other, comprising: (a) a housing; (b) light source means in the housing including a pair of lamps arranged side by side in spaced relation horizontally adjacent each other and casting parallel beams of light, each corresponding to a respective one of the pair of film strips; (c) a program module including: (1) a first cartridge element insertable in the housing containing a pair of reels arranged upright, parallel and in spaced relation horizontally adjacent each other, (2) the pair of film strips, including frames for forming visual images therefrom, respectively arranged on the reels and operatively disposed, each in front of a corresponding one of the pair of lamps, when the first cartridge element is positioned in the housing, (3) a second cartridge element insertable in the housing, and (4) a magnetic tape, including at least one track for recording control signals thereon, arranged in the second cartridge element; (d) means for directing light from the light source means through the film strips, out of the housing, and onto at least one screen, including a pair or mirrors arranged horizontally adjacent each other and in front of the corresponding lamps, said film strips being respectively interposed between the mirrors and the lamps when the first cartridge element is positioned in the housing, pivot means in the housing for pivoting the pair of mirrors in a manner permitting the unobstructed insertion or removal of the first cartridge element into or from the housing, and a lever arm connected to the pivot means and extending outside the housing for operating the pivot means; (e) a pair of film strip advancing means in the housing each engageable with a respective one of the film strips for advancing the film strip independently of the other; (f) means in the housing for driving the magnetic tape; and (g) means in the housing for sensing control signals recorded on the magnetic tape and operating the pair of film strip advancing means in response thereto, wherein each of the pair of mirrors is operatively disposed facing away from the other and at an angle of about 45° to incident light from the corresponding lamp, said mirrors thereby receiving the parallel beams of incident light passing through the pair of film strips and reflecting them horizontally in opposite directions and generally normal to the direction of incident light, said light directing means further including a pair of focusing lenses each movably arranged with respect to an axis coinciding with the path of reflected light for focusing light reflected from the corresponding mirror, and wherein said pivot means includes a shaft connected to the lever arm for axial rotational movement upon displacement of the lever arm, a first gear connected for rotation with the shaft, a second gear in mesh with the first gear, a first flange arm connecting one of the pair of mirrors with the first gear and a second flange arm connecting the other mirror with the second gear, said first and second flange arms pivoting the mirrors through an angle of about 45° toward each other to a position substantially adjacent and parallel each other when the lever arm is displaced to operate the pivot means, said pair of mirrors in the pivoted position being parallel to and accommodated in the space between the pair of reels of the first cartridge element, thereby permitting the unobstructed insertion or removal of the first cartridge element into or from the housing.

2. The dual film strip projector described in claim 1, wherein the film strips are continuous-loop film strips, each exiting from the center of the corresponding reel, describing a loop extending upwardly and in front of the corresponding lamp, and then being wound on an outer perimeter of the reel, the described loop thereby defining a space within which the corresponding mirror is operatively disposed.

3. A self-contained, automatic, dual film strip projector for projecting a plurality of images onto at least one screen, each of said images being projected from a corresponding frame of one of a pair of film strips which are operated in individually timed sequences independently of each other, comprising: (a) a housing; (b) light source means in the housing including a pair of lamps arranged side by side each corresponding to a respective one of the pair of film strips; (c) a program module including: (1) a first cartridge element insertable in the housing, (2) the pair of film strips, including frames for forming visual images therefrom, arranged side by side in the first cartridge element, (3) a second cartridge element insertable in the housing, and (4) a magnetic tape, including at least one track for recording control signals thereon, arranged in the second cartridge element; (d) means for directing light from the light source means through the film strips, out of the housing, and onto at least one screen, including a pair of mirrors each arranged in front of a corresponding one of the pair of lamps for reflecting light from the lamp in a predetermined direction, said film strips being respectively interposed between the mirrors and the lamps when the first cartridge element is positioned in the housing, pivot means in the housing for pivoting the pair of mirrors in a manner permitting the unobstructed insertion or removal of the first cartridge element into or from the housing, and a lever arm connected to the pivot means; and extending outside the housing for operating the pivot means (e) a pair of film strip advancing means in the housing each engagable with a respective one of the film strips for advancing the film strip independently of the other; (f) means in the housing for driving the magnetic tape; and (g) means in the housing for sensing control signals recorded on the magnetic tape and operating the pair of film strip advancing means in response thereto, wherein the lever arm includes a fail-safe member for preventing insertion or removal of the first cartridge element into or from the housing without first operating the pivot means, said fail-safe member consisting of a blocking member connected to the lever arm and positioned in a blocking position with respect to an aperture in the housing into which the first cartridge element is inserted, said blocking member being displaceable from the blocking position upon displacement of the lever arm to operate the pivot means.

4. A self-contained, automatic, dual film strip projector for projecting a plurality of images onto at least one screen, each of said images being projected from a corresponding frame of one of a pair of film strips which are operated in individually timed sequences independently of each other, comprising: (a) a housing; (b) light source means in the housing including a pair of lamps arranged side by side each corresponding to a respective one of the pair of film strips; (c) a program module including: (1) a first cartridge element insertable in the housing, (2) the pair of film strips, including frames for forming visual images therefrom, arranged side by side in the first cartridge element, (3) a second cartridge element insertable in the housing, and (4) a magnetic tape, including at least one track for recording control signals thereon, arranged in the second cartridge element; (d) means for directing light from the light source means through the film strips, out of the housing, and onto at least one screen, including a pair of mirrors each arranged in front of a corresponding one of the pair of lamps for reflecting light from the lamp in a predetermined direction, said film strips being respectively interposed between the mirrors and the lamps when the first cartridge element is positioned in the housing, pivot means in the housing for pivoting the pair of mirrors in a manner permitting the unobstructed insertion or removal of the first cartridge element into or from the housing, and a lever arm connected to the pivot means and extending outside the housing for operating the pivot means; (e) a pair of film strip advancing means in the housing each engagable with a respective one of the film strips for advancing the film strip independently of the other; (f) means in the housing for driving the magnetic tape; and (g) means in the housing for sensing control signals recorded on the magnetic tape and operating the pair of film strip advancing means in response thereto, wherein the pivot means includes: (1) a shaft connected to the lever arm for axial rotational movement upon displacement of the lever arm, and (2) a pair of flange arms each connecting a respective one of the mirrors to the shaft for pivoting the mirrors to a position permitting the unobstructed insertion or removal of the first cartridge element into or from the housing when the lever arm is displaced to operate the pivot means.

5. The dual film strip projector described in claim 4, wherein the pivot means further includes a fail-safe member for preventing insertion or removal of the first cartridge element into or from the housing without first operating the pivot means, said fail-safe member consisting of a catch member mounted on the shaft to engage the first cartridge element when it is positioned in the housing and to release the first cartridge element upon operation of the pivot means.

6. A self-contained, automatic, dual film strip projector for projecting a plurality of images onto at least one screen, each of said images being projected from a corresponding frame of one of a pair of film strips which are operated in individually timed sequences independently of each other, comprising: (a) a housing; (b) light source means in the housing; (c) a program module including: (1) a first cartridge element insertable in the housing, (2) the pair of film strips, including frames for forming visual images therefrom, arranged side by side in the first cartridge element, (3) a second cartridge element insertable in the housing, and (4) a magnetic tape, including at least one track for recording control signals thereon, arranged in the second cartridge element; (d) means for directing light from the light source means through the film strips, out of the housing, and onto at least one screen; (e) a pair of film strip advancing means in the housing each engagable with a respective one of the film strips for advancing the film strip independently of the other; (f) means in the housing for driving the magnetic tape; and (g) means in the housing for sensing control signals recorded on the magnetic tape and operating the pair of film strip advancing means in response thereto, wherein the second cartridge element has a space therein defined by a wall of the second cartridge element and by an exposed section of the magnetic tape, and wherein the magnetic tape driving means includes: (1) a capstan in the housing located adjacent the exposed section of the magnetic tape when the second cartridge element is positioned in the housing, (2) a pressure roller movable into the space defined in the second cartridge element for engaging in exposed section of the magnetic tape against the capstan when the second cartridge element is positioned in the housing, and displaceable to a standby position permitting the unobstructed insertion or removal of the second cartridge element into or from the housing, and (3) a linkage connected to the pressure roller and extending from the housing for displacing the pressure roller, including a fail-safe member for preventing insertion or removal of the second cartridge element into or from the housing without first displacing the pressure roller to the standby position, said fail-safe member consisting of a blocking member connected to the linkage and positioned in a blocking position with respect to an aperture in the housing into which the second cartridge element is inserted, said blocking member being displaceable from the blocking position upon operating the linkage to displace the pressure roller to the standby position.

7. A self-contained, automatic, dual film strip projector for projecting a plurality of images onto at least one screen, each of said images being projected from a corresponding frame of one of a pair of film strips which are operated in individually timed sequences independently of each other, comprising: (a) a housing; (b) light source means in the housing including a pair of lamps arranged side by side each corresponding to a respective one of the pair of film strips; (c) a program module including: (1) a first cartridge element, (2) the pair of film strips, including frames for forming visual images therefrom, arranged side by side in the first cartridge element, (3) a second cartridge element joined with the first cartridge element into an integral unit insertable in the housing, and (4) a magnetic tape, including at least one track for recording control signals thereon, arranged in the second cartridge element; (d) means for directing light from the light source means through the film strips, out of the housing, and onto at least one screen, including a pair of mirrors each arranged in front of a corresponding one of the pair of lamps for reflecting light from the lamp in a predetermined direction, said film strips being respectively interposed between the mirrors and the lamps when the first cartridge element is positioned in the housing, pivot means in the housing for pivoting the pair of mirrors in a manner permitting the unobstructed insertion or removal of the first cartridge element into or from the housing, and a lever arm connected to the pivot means and extending outside the housing for operating the pivot means; (e) a pair of film strip advancing means in the housing each engagable with a respective one of the film strips for advancing the film strip independently of the other; (f) means in the housing for driving the magnetic tape; and (g) means in the housing for sensing control signals recorded on the magnetic tape and operating the pair of film strip advancing means in response thereto, wherein the second cartridge element has a space therein defined by a wall of the second cartridge element and by an exposed section of the magnetic tape, and wherein the magnetic tape driving means includes: (1) a capstan in the housing located adjacent the exposed section of the magnetic tape when the second cartridge element is positioned in the housing, (2) a pressure roller movable into the space defined in the second cartridge element for engaging the exposed section of the magnetic tape against the capstan when the second cartridge element is positioned in the housing, and displaceable to a standby position permitting the unobstructed insertion or removal of the second cartridge element into or from the housing, and (3) a linkage connecting the pressure roller to the lever arm for displacing the pressure roller simultaneously with operating the pivot means, whereby the unobstructed insertion or removal of the integral program module unit into or from the housing is permitted.

8. The dual film strip projector described in claim 7, wherein the lever arm includes a fail-safe member for preventing insertion or removal of the integral unit into or from the housing without first operating the pivot means and displacing the pressure roller.

9. The dual film strip projector described in claim 8, wherein the fail-safe member is a blocking member connected to the lever arm and positioned in a blocking position with respect to an aperture in the housing into which the integral unit is inserted, said blocking member being displaceable from the blocking position upon displacement of the lever arm to operate the pivot means and to displace the pressure roller.

10. A self-contained, automatic, dual film strip projector for projecting a plurality of images onto at least one screen, each of said images being projected from a corresponding frame of one of a pair of film strips which are operated in individually timed sequences independently of each other, comprising: (a) a housing; (b) light source means in the housing; (c) a program module including: (1) a first cartridge element insertable in the housing, (2) the pair of film strips, including frames for forming visual images therefrom, arranged side by side in the first cartridge element, (3) a second cartridge element insertable in the housing, and (4) a magnetic tape, including at least one track for recording control signals thereon, arranged in the second cartridge element; (d) means for directing light from the light source means through the film strips, out of the housing, and onto at least one screen; (e) a pair of film strip advancing means in the housing each engagable with a respective one of the film strips for advancing the film strip independently of the other; (f) means in the housing for driving the magnetic tape; (g) means in the housing for sensing control signals recorded on the magnetic tape and operating the pair of film strip advancing means in response thereto; and (h) frame adjustment means cooperating with the pair of film strip advancing means for adjusting the position of the frames of the film strips with respect to the light source means such that images projected by the projector include the visual images of entire frames, wherein the frame adjustment means includes a pair of elevation means each associated with a respective one of the film strip advancing means and having: (1) carriage means movably mounted in the housing for vertical adjustment movement and supporting the respective film strip advancing means, (2) an adjusting rod mounted for axial rotation with respect to the housing, one end of the rod extending outside of the housing and the other end being threaded and disposed in the interior of the housing, (3) driver means arranged for longitudinal movement with respect to the rod, said driver means including a thread-following shank portion in mesh with the threads of the other end of the rod, and (4) means positioned in engagement between the driver means and the carriage means for translating the longitudinal movement of the driver means into vertical adjustment movement of the carriage means.

11. A program module for a dual film strip projector of the type having: (a) a housing, (b) light source means, (c) means in the housing for directing light including a pair of mirrors operatively disposed with respect to the light source means for reflecting light, emanating therefrom and passing through a corresponding pair of film strips, for display on at least one screen, and pivot means for pivoting the pair of mirrors together, (d) a pair of film strip advancing means for advancing a corresponding pair of film strips independently of each other, (e) means for driving a magnetic tape, and (f) means for sensing control signals recorded on a magnetic tape and operating the pair of film strip advancing means in response thereto, the program module comprising: (1) a first cartridge element insertable in the housing having a pair of film strips, including frames for producing visual images therefrom, carried on a corresponding pair of upright reels arranged side by side in the first cartridge element, and (2) a second cartridge element insertable in the housing and containing a magnetic tape having at least one track for recording control signals thereon, wherein the first cartridge element includes a wall defining a first recess between the pair of reels in which the pair of mirrors is accommodated when the pivot means is operated to pivot the mirrors, so as to permit the unobstructed insertion or removal of the first cartridge element into or from the housing, and other walls defining a pair of second recesses each located relative to a respective one of the pair of reels such that the corresponding mirror, when operatively disposed relative to the reel carrying the film strip, is positioned in the second recess so as to have the film strip interposed between it and the light source means.

12. The program module described in claim 11, wherein the magnetic tape includes another track for recording audio signals thereon.

13. The program module described in claim 11, wherein the first cartridge element is joined with the second cartridge element into an integral unit insertable in the housing.

14. A self-contained, automatic, dual film strip projector for projecting a plurality of images onto at least one screen, each of said images being projected from a corresponding frame of one of a pair of film strips which are operated in individually timed sequences independently of each other, comprising: (a) a housing; (b) light source means in the housing; (c) a program module including: (1) a first cartridge element insertable in the housing, (2) the pair of film strips, including frames for forming visual images therefrom, arranged in the first cartridge element, (3) a second cartridge element insertable in the housing, and (4) a magnetic tape, including at least one track for recording control signals thereon, arranged in the second cartridge element; (d) means for directing light including a pair of mirrors operatively disposed with respect to the light source means for reflecting light emanating therefrom and passing through the film strips for display on the at least one screen, said film strips being respectively interposed between the mirrors and the light source means when the first cartridge element is positioned in the housing, pivot means in the housing for pivoting the pair of mirrors together in a manner permitting the unobstructed insertion or removal of the first cartridge element into or from the housing, and control means connected to the pivot means for operating the pivot means, said control means including a fail-safe member for preventing insertion or removal of the first cartridge element into or from the housing without first operating the pivot means; (e) a pair of film strip advancing means in the housing each engagable with a respective one of the film strips for advancing the film strip independently of the other; (f) means in the housing for driving the magnetic tape; and (g) means in the housing for sensing control signals recorded on the magnetic tape and operating the pair of film strip advancing means in response thereto.

15. A self-contained, automatic, dual film strip projector for projecting a plurality of images onto at least one screen, each of said images being projected from a corresponding frame of one of a pair of film strips which are operated in individually timed sequences independently of each other, comprising: (a) a housing; (b) light source means in the housing; (c) a program module including: (1) a first cartridge element insertable in the housing, (2) the pair of film strips, including frames for forming visual images therefrom, arranged in the first cartridge element, (3) a second cartridge element insertable in the housing, and (4) a magnetic tape, including at least one track for recording control signals thereon, arranged in the second cartridge element; (d) means for directing light including a pair of mirrors operatively disposed with respect to the light source means for reflecting light emanating therefrom and passing through the film strips for display on the at least one screen, said film strips being respectively interposed between the mirrors and the light source means when the first cartridge element is positioned in the housing, pivot means in the housing for pivoting the pair of mirrors together in a manner permitting the unobstructed insertion or removal of the first cartridge element into or from the housing, and control means connected to the pivot means for operating the pivot means; (e) a pair of film strip advancing means in the housing each engagable with a respective one of the film strips for advancing the film strip independently of the other; (f) means in the housing for driving the magnetic tape; and (g) means in the housing for sensing control signals recorded on the magnetic tape and operating the pair of film strip advancing means in response thereto, wherein the pair of film strips is respectively carried on a pair of upright reels arranged side by side in the first cartridge element, and wherein the first cartridge element includes a wall defining a first recess between the pair of reels in which the pair or mirrors is accommodated when the pivot means is operated to pivot the mirrors, so as to permit the unobstructed insertion or removal of the first cartridge element into or from the housing, and other walls defining a pair of second recesses each located relative to a respective one of the pair of reels such that the corresponding mirror, when operatively disposed relative to the reel carrying the film strip, is positioned in the second recess so as to have the film strip interposed between it and the light source means.

* * * * *

UNITED STATES PATENT OFFICE
CERTIFICATE OF CORRECTION

Patent No. 4,067,647　　　　　　　　　　Dated January 10, 1978

Inventor(s) Harold Gallina

It is certified that error appears in the above-identified patent and that said Letters Patent are hereby corrected as shown below:

Column 1, line 42, after "means", insert -- each --;

Column 5, line 37, "29b" should read -- 28b --;

Column 9, line 11, "real housings" should read -- reel housings --;

Column 9, line 15, "25a, 95b" should read -- 95a, 95b --;

Column 11, line 34, "state" should read -- stage --;

Column 12, line 35, "pair or" should read -- pair of --;

Column 13, line 51, "means;" should read -- means --;

Column 13, line 53, "pivot means" should read -- pivot means; --;

Column 15, line 24, "engaging in" should read -- engaging the --; and

Column 19, line 5, "pair or" should read -- pair of --.

Signed and Sealed this

Second Day of May 1978

[SEAL]

Attest:

RUTH C. MASON　　　　　LUTRELLE F. PARKER
Attesting Officer　　　Acting Commissioner of Patents and Trademarks